United States Patent [19]

DiClemente et al.

[11] Patent Number: 5,228,998
[45] Date of Patent: Jul. 20, 1993

[54] FLOATING BIOLOGICAL CONTACTOR

[76] Inventors: Lee M. DiClemente, 76 Gorham St., Canandaigua, N.Y. 14424; John W. Pickering, 120 E. Main St., Victor, N.Y. 14564; Robert M. Wansea, 1875 E. Main St., Rochester, N.Y. 14609

[21] Appl. No.: 889,059

[22] Filed: May 26, 1992

[51] Int. Cl.$^5$ .............. C02F 3/06; C02F 7/00
[52] U.S. Cl. .................. 210/610; 210/614; 210/617; 210/629; 210/150; 210/170; 210/242.2; 210/194; 210/747
[58] Field of Search .......... 210/610, 611, 612, 614, 210/615, 617, 629, 747, 150, 151, 170, 242.2, 194, 196, 220

[56] References Cited

U.S. PATENT DOCUMENTS

| | | | |
|---|---|---|---|
| 3,490,752 | 1/1970 | Danjes et al. | 261/122 |
| 3,505,213 | 4/1970 | Anthony et al. | 210/170 |
| 3,589,997 | 6/1971 | Grutsch et al. | 210/219 |
| 3,664,647 | 5/1972 | Snow | 261/30 |
| 3,671,022 | 6/1972 | Laird et al. | 210/170 |
| 3,704,008 | 11/1972 | Ziegler | 210/170 |
| 3,984,323 | 10/1976 | Evens | 210/220 |
| 4,039,437 | 8/1977 | Smith et al. | 210/170 |
| 4,072,612 | 2/1978 | Daniel | 210/220 |
| 4,086,306 | 4/1978 | Yoshinaga | 210/220 |
| 4,191,479 | 3/1980 | Shuck et al. | 366/101 |
| 4,215,082 | 7/1980 | Danel | 210/220 |
| 4,263,142 | 4/1981 | Burton | 210/170 |
| 4,350,589 | 9/1982 | Stog | 210/242.2 |
| 4,439,316 | 3/1984 | Kozima et al. | 210/150 |
| 4,670,149 | 6/1987 | Francis | 210/610 |
| 4,680,111 | 7/1987 | Ueda | 210/150 |
| 4,876,288 | 10/1989 | Herding et al. | 210/615 |
| 4,925,564 | 5/1990 | Francis | 210/615 |

FOREIGN PATENT DOCUMENTS 1377571 9/1964 France .
358414 11/1989 South Africa .

Primary Examiner—Stanley S. Silverman
Assistant Examiner—Christopher Upton
Attorney, Agent, or Firm—Eugene Stephens & Associates

[57] ABSTRACT

The method and apparatus of the invention are directed to the removal of pollutants from ponds, lagoons, streams, and similar waters. Floating apparatus is designed to house, nurture, and support colonies of fixed-film bacteria and/or more complex microorganisms specifically appropriate for consuming the particular contaminants present in the pond being treated. The colonies of microorganisms are first grown as bio-films in a relatively large bio-chamber that is filled with bio-suspension forms. Then, only after the colonies become large and stable, is pond water circulated through the bio-chamber, such circulation being gentle and without agitation. The apparatus also includes (a) a pond-water intake; (b) a water mixing chamber; and (c) an equipment pod which houses water and air pumps, a water heater, a weather station, water-condition monitoring devices, and a microprocessor. Also, special methodology and apparatus make it possible to establish such large and stable colonies of appropriate microorganisms in cold water.

19 Claims, 3 Drawing Sheets

FLOATING BIOLOGICAL CONTACTOR

TECHNICAL FIELD

The invention relates to method and equipment for the biological treatment of polluted waters and, more particularly, to the consumption of undesirable biodegradable materials in ponds, lagoons, streams, or other relatively open waters.

BACKGROUND OF THE INVENTION

Many different methods and types of equipment are known for reducing pollutants in the treatment of waste water. Some of these known methods and apparatus are specially designed for use in relatively confined tanks (or wet wells scum pits etc.) In U.S. Pat. Nos. 4,670,149 (Francis) and 4,680,111 (Ueda), bacterial incubators are floated or suspended near or just below the surface of the water being treated; and the Francis patent provides for the augmentation of the processes for decomposing organic waste by the addition of highly-cultivated strains of microorganisms having a high capacity for "specific organic reduction of grease and other troublesome substances".

The just-described bacterial incubator beds are filled with a plurality of one or more types of well-known bio-suspension elements which are usually made from injection molded resins and specially designed to provide large surfaces conducive to the growth of bacterial colonies, while at the same time providing excellent liquid flow through and around the surfaces to disperse the bacteria in a controlled fashion in the liquid phase. One such well-known bio-suspension element has an overall spherical shape, is approximately 2 inches (5 cm) in diameter, and has an open construction formed by a multiplicity of circular members which join and support a plurality of internal cross members.

Aeration devices which create very fine bubbles of air are also particularly suited to the treatment of wastes in relatively confined bodies of water. Examples of the latter are disclosed in U.S. Pat. Nos. 3,490,752 (Danjes et al.); 3,664,647 (Snow); and 4,215,082 (Danel).

Other known prior art devices are specially designed for use in larger bodies of water, e.g., ponds, lagoons, etc.; and all of these are directed to the aeration of the water by agitation, using such means as paddle-wheels, pumps, and water jets. For example, a large mixing pump is shown in U.S. Pat. No. 4,072,612 (Daniel), while water-jet mixers are disclosed in U.S. Pat. No. 3,984,323 (Evens) and French Patent No. 1.377.571. Some of these agitators are specially designed to float on the surface of the water: a floating paddle-wheel agitator is shown in U.S. Pat. No. 3,589,997 (Grutsch et al.), while U.S. Pat. No. 4,191,479 (Shuck et al.) shows a floating paddle-wheel agitator combined with an air compressor and an air distribution pipe that can be lowered into the pond as deep as 10 feet to deliver high-velocity air to disrupt and agitate the sludge. A floating centrifugal pump is disclosed in U.S. Pat. No. 4,086,306 (Yoshinaga).

A floating unit disclosed in U.S. Pat. No. 4,350,589 (Stog) provides water-jet aeration in combination with air-bubble confinement means causing the bubbles to remain longer in contact with the microorganisms present in the water being treated. Finally, South African Patent No. 358 414 (Stog) shows floating apparatus similar to the previously-described Stog unit in which microorganisms developed within the unit are collected from the downstream path and recycled, being reintroduced in or behind the water-jet aeration/agitation pump along with new microorganisms. The floating unit of the latter reference utilizes plastic strings within its air-bubble confinement chamber for providing surfaces for the growth of the microorganisms.

The above-described prior art water treatment methods and devices are either inappropriate for use in relatively open bodies of water such as ponds and lagoons, or they suffer from serious deficiencies that make them less than satisfactory for such use, particularly where the water being treated is at near-freezing temperatures.

SUMMARY OF THE INVENTION

Our invention has some similarity to prior art apparatus such as those disclosed in the above-identified Stog references insofar as it utilizes a floating platform that circulates contaminated water through submerged chambers which accelerate the growth of bacteria and-/or more complex microorganisms (hereinafter "microorganisms") that biodegrade the pond's contaminants. Our invention also uses pumps for circulating water and as a means for introducing air into oxygen-depleted water.

However, the method and apparatus of our invention do not utilize paddles nor water jets, nor do they rely in any way upon the type of uncontrolled aeration that is the primary activity of prior art methods using equipment such as floating jet aerators, trickle towers, rotating biological contactors, etc. To the contrary, our invention achieves the biological activity that it uses to reduce pollutants by specifically avoiding uncontrolled turbulence in water being treated. Further, the invention does not just mix air with microbes pumped from the bottom of the water body (i.e., the pond, lagoon, stream, etc., hereinafter merely referred to as a "pond").

The intended purpose of the subject invention is to first create a large floating colony of microorganisms specifically appropriate for consuming the particular biodegradable pollutants in the water being treated. It is only after the desired microbe colonies are well developed and secure in a submerged bio-chamber carried by the floating platform that pond water is then regularly circulated through these colonies for cleaning. The invention does not utilize a venturi for drawing air into the floating tank, but instead, selectively operates a blower to introduce air only when oxygen is needed, and then only in a controlled amount and manner. When operating, the water being treated by the apparatus of the invention is not delivered through an uncontrollable jet, but rather is selectively introduced through multiple delivery outlets that are positioned to cause the pond water to move slowly in corkscrew fashion through the microorganisms in the submerged chamber.

The microorganisms are grown on a multitude of bio-suspension elements, such as the resin geometric forms described above which have relatively large and stable surface areas for supporting bio-films and also have large voids to reduce the possibility of plugging and to permit appropriate circulation of water around and through the bio-films. As just indicated, heavy turbulence of the input stream is intentionally avoided, since it might scrub off and severely deplete the bio-film colony which is the key working ingredient of the invention.

The floating apparatus of the invention, which is designed to house, nurture, support, and feed the colony of microorganisms, includes (a) a relatively large bio-film chamber that is filled with the bio-suspension forms; (b) a pond-water intake; (c) a water mixing chamber; and (d) an equipment pod which houses water and air pumps, a water heater, and water-condition monitoring devices. Also, communication pipes and an electronic probe in the bio-film chamber permit automatic testing of water samples from time to time, and these same communication pipes can be used to introduce additional microbes and/or appropriate chemicals into the bio-film chamber (e.g., to change the pH of the water). This testing and analysis means includes known water quality monitoring equipment such as the Portable Multi-Parameter Logging System (Model YSI/-GRANT 3800) sold by YSI, Inc. of Yellow Springs, Ohio, U.S.A.

After a colony of appropriate microorganisms has been established in the bio-film chamber, pond water is gently circulated from the intake to the plurality of outlets referred to above, some of which deliver the water directly to the bio-film chamber and others of which deliver it to the mixing chamber. If samples taken from the bio-film chamber indicate that the water in the chamber has insufficient oxygen, the air blower is activated to introduce a controlled amount of air into the water being delivered to the mixing chamber. Although the mixing chamber is contiguous with the bio-film chamber, it is separate therefrom so that the bubble turbulence which accompanies the mixing of air and water occurs primarily in the mixing chamber, minimizing any scrubbing effect such turbulence may have on the bio-film.

In the preferred embodiments, the intake does not draw water from or near the bottom of the pond, but rather from a specific area approximately 4 feet (1.2 meters) below the pond surface. This area is a known bio-zone that contains the most abundant quantities of indigenous bacteria and protozoa which are drawn in by the invention's circulating means to augment the bio-film colony and enhance its effectiveness. Further, appropriate computer-controlled monitors, timers, valves, etc. are used for automatically sampling, testing, and controlling the flow and character of the water being treated by the bio-film colony. In this regard, when the bio-film colony is large and well-established, additional air and further bio-zone microorganisms ar introduced directly into the bio-film chamber as well as to the mixing enclosure to assure balanced and effective operation of the bio-film colonies.

In their preferred embodiments, the method and apparatus of the invention may also be directed to creating an appropriately large colony of fixed-film microorganisms in relatively cold water. To this end, the walls of the floating bio-film chamber may be insulated and its screened exit port can be closed off, permitting the water within the chamber to be circulated through a water heater to raise its temperature above 40° F., thereby enhancing microbe growth. After the bio-film colony is well established, the water in the chamber is allowed to return gradually to pond temperature; and then the chamber is again opened and the process of gently circulating pond water through the bio-film chamber is begun.

DRAWINGS

DETAILED DESCRIPTION OF PREFERRED EMBODIMENTS

Figures 1, 2:
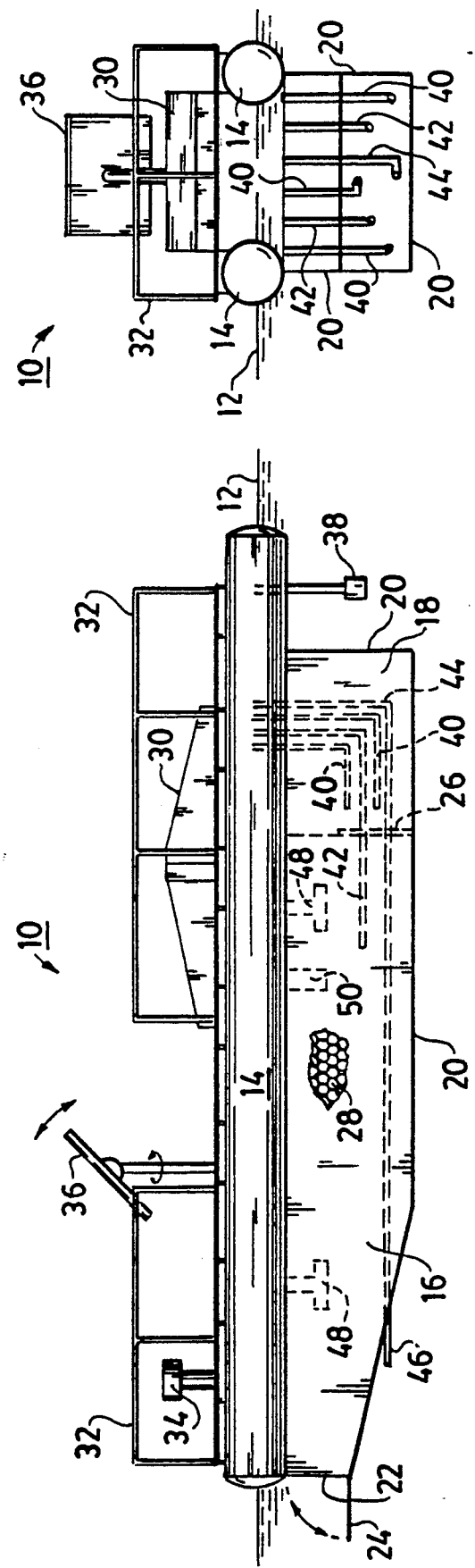
FIGS. 1 and 2 are schematic side and end views, respectively, of a floating biological contactor according to a preferred embodiment of the invention.

Referring to FIGS. 1 and 2, the invention's biological contactor 10 is floatably supported on a pond surface 12 by means of a structural framework carried by large pontoons 14. Suspended below pontoons 14 are a bio-chamber 16 and a mixing chamber 18 that are surrounded on all sides by water-impervious walls 20. In preferred embodiments, walls 20 are insulated, and chambers 16 and 18 are suspended below water surface 12. In this regard, smaller pontoons (not shown) may also be carried on the framework below the water line for additional buoyancy or for receiving varying amounts of ballast as needed to control the draft of floating contactor 10.

The front end of bio-chamber 16 has an open screen wall 22 that can be selectively closed by means of a trap door 24; and a second screen wall 26 at the rear of bio-chamber 16 serves as a divider between chamber 16 and mixing chamber 18. The mesh of screen walls 22, 26 is selected to permit the free flow of water therethrough while retaining a plurality of resin bio-suspension elements 28 which, as explained above, are packed solidly within chamber 16 to create a very large and stable surface area for the growth of colonies of desired microorganisms.

An equipment pod 30 is mounted on the deck of floating contactor 10 to house pumps, a blower, a microprocessor, and other machinery and instrumentation which will be discussed in greater detail below. The deck is surrounded by a guard rail 32 (shown partially) and also carries a winch 34 for servicing anchor/tow lines for handling and mooring purposes. An above-deck solar panel 36 is automatically positioned to follow the sun to provide supplemental electrical power.

A pond-water intake 38 (omitted in FIG. 2) is positioned approximately 4 feet (1.2 meters) below the pond surface in the bio-zone that is known to contain the most abundant quantities of indigenous microorganisms. When floating contactor 10 is in operation, pond-water circulation means draws water in at intake 38 and selectively directs the water through one or more of the pipes 40, 42, 44 to respective delivery outlets located in mixing chamber 18 and bio-chamber 16 as well as to a hydraulic-pull outlet 46 located outside the front wall of bio-chamber 16.

The volume and velocity of the pond water being delivered through different combinations of pipes 40, 42, and 44 is controlled appropriately to assure the creation and maintenance of stable colonies of microorganisms in bio-film chamber 16 and to maximize the effectiveness of said colonies in the consumption of pollutants from the water being delivered. When trap door 24 is open and pond water is delivered through pipe 44 to hydraulic-pull outlet 46, a current is formed in front of open screen 22, causing water to be pulled gently from bio-chamber 16. Similarly, the pond-water circulation means appropriately controls the water delivered to pipes 40 and 42 so that the pond water flows through bio-chamber 16 in a gentle corkscrew motion.

At least two communication pipes 48 and the electronic sonde or probe 50 of a known water analysis system (e.g., the YSI system referred to above) are located within bio-chamber 16 as means for introducing/testing chemicals and microorganisms within the chamber.

Figure 3:
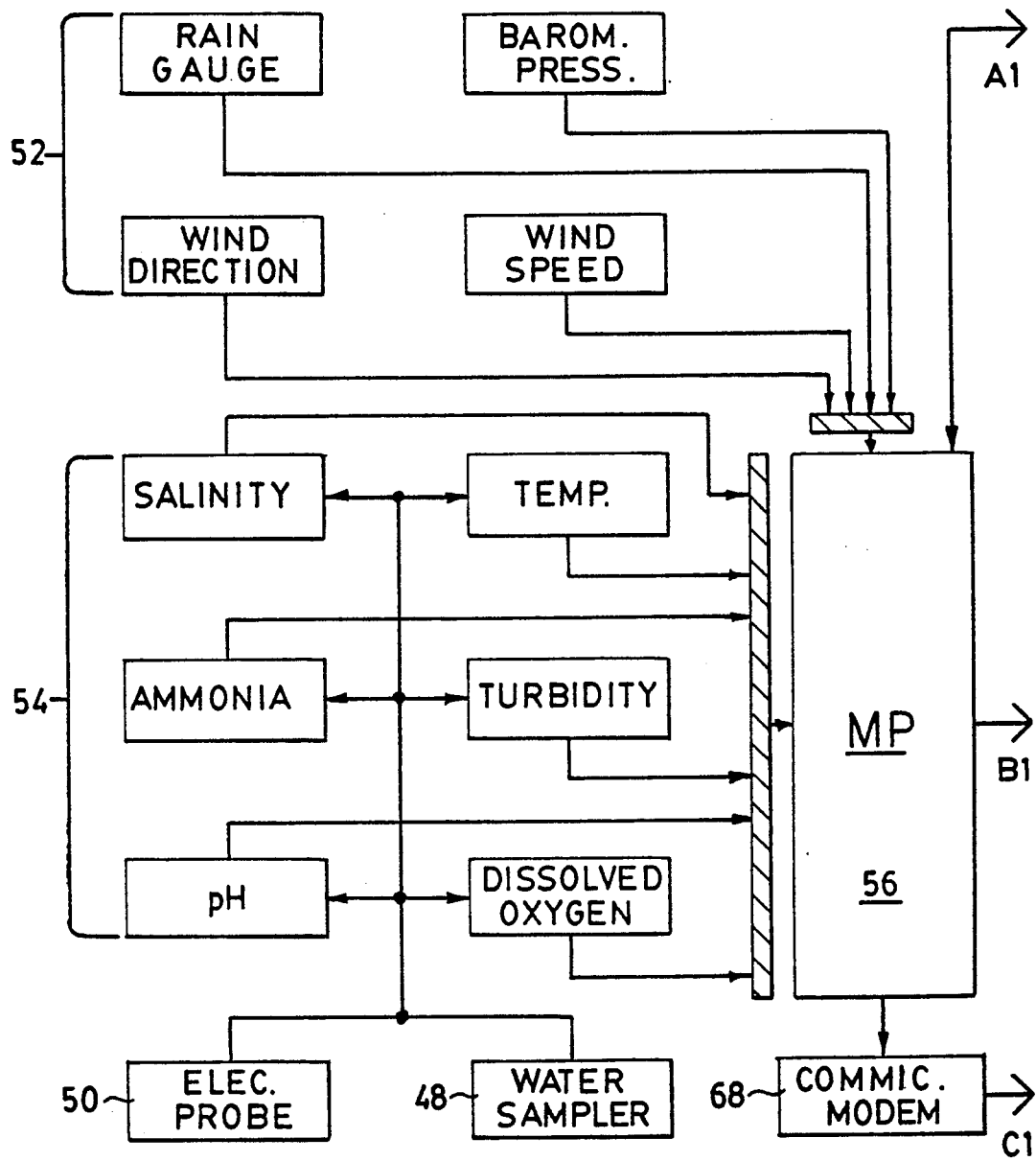
FIG. 3 is a block/flow diagram indicating relationships between the primary elements of the machinery and instrumentation carried by the biological contactor shown in FIGS. 1 and 2.
Figure 3:
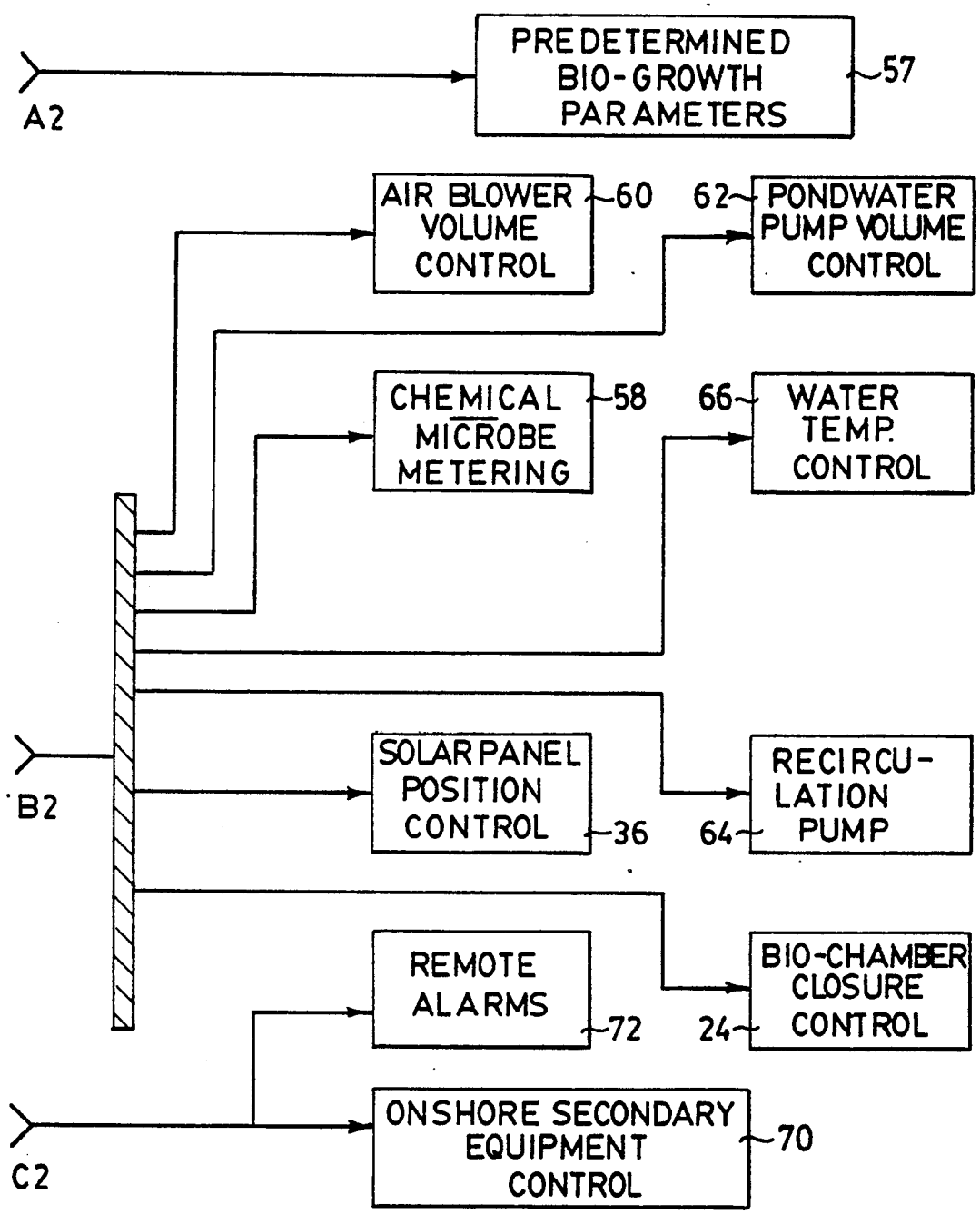

Referring to FIG. 3., the instrumentation carried by biological contactor 10 includes a weather station 52 as well as the water analysis system 54. Weather station 52 monitors wind direction and speed, barometric pressure, and rain accumulation, while analysis system 54 monitors the water in bio-chamber 16 for turbidity, salinity, temperature, pH, dissolved oxygen, and ammonia content. The information collected by station 52 and analysis system 54 is delivered to a microprocessor 56 that compares the information with desired parameters 57 which have been predetermined to be conducive to the well-being of the microorganism colonies being grown and maintained in bio-chamber 16. Pre-programmed logic in microprocessor 56 generates outputs indicative of this comparison to control the operation of the floating contactor's various machinery.

For instance, if the pH of the water is too low, the metering mechanism 58 is energized to introduce an appropriate amount of acid through communication pipes 48. Similarly, if the testing indicates that dissolved oxygen is less than is optimally desired, an air-introduction means is activated, operating the air blower 60 to mix air into the water being circulated through pipes 40, 42. In regard to the latter, a greater volume of air is mixed with the water in pipes 40 than in pipes 42 to minimize the turbulence in bio-chamber 16; and if the colonies of microorganisms are not well stabilized, or if low temperatures make the colonies particularly susceptible to being detached easily by scrubbing, then air is only mixed with the water in pipes 40.

If the pond temperature is low and the population of the microorganism colonies measures low, microprocessor 56 stops the operation of the pond-water pump 62, closes trap door 24, and energizes recirculation pump 64 to send the water in bio-chamber 16 and mixing chamber 18 through water-heating apparatus 66. The microorganism colony is then monitored and augmented from time to time until further testing indicates that the microorganism population is sufficient to be sustained under the low temperature conditions. When this occurs, microprocessor 56 stops the recirculation of the water, which is then allowed to gradually cool to pond temperature; and, thereafter, trap door 24 is reopened and pond water is once again delivered through pipes 40, 42, 44.

A modem 68 and known cellular phone apparatus (not shown) are used to deliver information to onshore monitors, displays, computers, or other equipment 70; and this radio-telephone system is also used to activate the visual and/or audio displays of remote onshore alarms 72 in the event of failure of onboard monitoring systems or machinery. Further, while this disclosure identifies individually operated air and water pumps for carrying out the various functions of floating biological contactor 10, it should be understood that these functions can be accomplished by other well-known machinery, e.g., a single compressor can be used to operate a plurality of airlift water pumps as well as the air blower for satisfactory implementation of the water circulating and air mixing operations in an energy efficient manner.

Operational tests of our floating biological contactor have indicated that it is remarkably efficient in the removal of selected biodegradable pollutants from ponds and other bodies of water: Following analysis of the pond water to determine one or more types of microorganism appropriate for biodegrading the identified pollutants, trap door 24 is closed and appropriate bacteria is metered into bio-chamber 16 through communication pipes 48 (and, if appropriate, pipes 40 and/or 42) at controlled rates and temperatures to initiate and augment the growth of bio-film colonies of the bacteria. The size of the colonies is monitored; and additional new pond water (mixed with air, if necessary) is introduced from time to time in a manner that minimizes the circulation or motion of the water in bio-chamber 16. The growing colonies are nurtured until the bacterial film on the bio-suspension elements is deemed sufficiently large and stable to withstand the mild scrubbing of moving currents. At this time, trap door 24 is opened and pond-water pump 62 begins circulating pond water gently through bio-chamber 16.

This controlled nurturing process greatly accelerates the growth of the bacterial film, which can reach an effective and stable bio-mass size in a few weeks as compared to several months if left to the usual natural growth rate of such microorganisms on the bottom of the pond. The gentle circulation of the pond water through the stable colony and the careful introduction of oxygen as required without undue agitation in bio-chamber 16, maximizes the amount of pollutant metabolized by the colony while maintaining the colony in a stable and effective state. Where more than one serious pollutant is to be treated, e.g., where municipal waste (major pollutant: ammonia) is also contaminated with some industrial waste (e.g., benzine), it is possible to introduce colonies of different bacterial strains in bio-chamber 16 at the same time, provided that the two variations of bacteria are compatible.

To facilitate the continuing viability of the bio-film colonies, water analysis system 54 is activated at regular intervals to test the chemical and microbiological conditions in bio-chamber 16, and corrective chemicals and/or additional microbes are metered into bio-chamber 16 through communication pipes 48 as necessary in the manner described above.

We claim:

1. A method using biological microorganisms for removing selected biodegradable materials from a pond or similar body of water, comprising the steps of:

analyzing a sample of said pond water to determine at least one type of microorganism appropriate for feeding on said selected materials;

fixing a plurality of bio-suspension elements within an enclosure which is floating at least partially submerged in said water body, said elements providing surfaces for supporting the growth of films of biological microorganisms;

introducing said appropriate microorganisms into said enclosure along with discrete amounts of said pond water for growing colonies of said appropriate microorganisms on said bio-suspension elements while circulation or other motion of said pond water is minimized in said enclosure;

sampling, testing, and analyzing the water and microorganisms in said enclosure, and nurturing the growth of said microorganisms until large and stable colonies of said microorganisms have been established on said bio-suspension elements; and, thereafter, circulating pond water gently and regularly through and around said stable colony of appropriate microorganisms in said enclosure and returning said circulated water to the pond.

2. The method of claim 1 comprising the further steps determining the water chemistry and bio-film density conditions suitable for facilitating the viability of said stable colony of predetermined microorganisms in said enclosure;

testing the water and microorganisms in said enclosure from time to time;

comparing said tested water and microorganisms with said suitable conditions; and adding chemicals, air, and microorganisms to said enclosure to maintain said predetermined suitable conditions.

3. The method of claim 1 wherein said circulating step further comprises causing said pond water to circulate through said colony in a gentle corkscrew motion.

4. The method of claim 1 wherein said circulating step further comprises drawing said water from an intake positioned approximately 4 feet beneath the surface of said pond.

5. The method of claim 1 wherein, when the temperature of said pond water is within a few degrees of freezing, said growing step further comprises:

insulating said enclosure;

heating the water in said insulated enclosure to at least 40° F. until said stable colony is established; and allowing the water in said enclosure, prior to said circulating step, to return gradually to the ambient temperature of the water to be used for said circulating step.

6. Apparatus for facilitating the use of biological microorganisms for removing selected biodegradable materials from a pond or similar body of water, said apparatus comprising:

a bio-chamber in an enclosure having water-impervious walls along its length and at least one end supported by floatation means so that a portion of the chamber is positioned below the surface of said pond;

a plurality of bio-suspension forms held firmly said chamber for providing surfaces for supporting the growth of films of said biological microorganisms; and circulating means for receiving water from said pond, for delivering said pond water to said bio-chamber so that said water circulates gently around said bio-suspension form surfaces and any films of microorganisms supported thereon, and for returning said circulated water to said pond.

7. The apparatus of claim 6 wherein said circulating means further comprises air-introduction control means for selectively mixing adjustable amounts of air into the water being circulated in said bio-chamber.

8. The apparatus of claim 7 wherein said air-introduction control means further comprises blower means.

9. The apparatus of claim 6 wherein said circulating means further comprises intake means for receiving said water at a depth of 4 feet below the surface of said water body.

10. The apparatus of claim 6 wherein said flotation means supports said bio-chamber so that it is submerged at an average depth of 4 feet below the surface of said pond.

11. The apparatus of claim 6 further comprising chamber-condition control means for adjusting the chemistry and microorganisms in said bio-chamber to facilitate the viability of said microorganisms, said chamber-condition control means comprising:

means for testing water in said bio-chamber from time to time; and analysis means for determining the chemistry and microorganisms in said tested water.

12. The apparatus of claim 11 wherein said chamber-condition control means further comprises:

means for comparing said chemistry and microorganisms in said tested water with predetermined desired parameters, and for producing an output indicative of said comparison; and adjustment means for adding chemicals, air, and microorganisms to said bio-chamber in accordance with the output of said comparing means.

13. The apparatus of claim 6 wherein said bio-chamber has openings at each end thereof and said bio-suspension forms are held within said chamber by screen means positioned over said openings.

14. The apparatus of claim 6 wherein said bio-chamber has openings at each end thereof and wherein said circulating means further comprises:

a mixing chamber in said enclosure contiguous with one end of said bio-chamber, said mixing chamber being open to the opening at said one end of said bio-chamber but being otherwise completely surrounded by water-impervious walls;

a plurality of outlets positioned to deliver pond water within said mixing enclosure; and air-introduction control means for selectively mixing adjustable amounts of air into the water being delivered to said mixing chamber.

15. The apparatus of claim 14 wherein said plurality of outlets is positioned so that said gentle circulation of pond water through said bio-chamber flows in a corkscrew fashion.

16. The apparatus of claim 6 wherein said enclosure is surrounded along its length and at least at one end by insulated water-impervious walls, said pond-water circulating means is selectively operable, and said apparatus further comprises water-heating means having:

means for deactivating said pond-water circulating means and for closing the open end of said enclosure so that said enclosure is completely surrounded by insulated walls;

a water heater; means for circulating water from the bio-chamber to the water heater and back into the chamber; and water-temperature control means sensitive to the temperature of water in said bio-chamber for activating said water-heater circulating means to maintain the water in the chamber at a predetermined temperature.

17. The apparatus of claim 16 wherein, when water in said pond is near freezing, said predetermined temperature is at least 40° F., and wherein said water-heating means further comprises:

means for maintaining the water in said bio-chamber at said predetermined temperature for a preselected time interval;

means for deactivating said water-temperature control means following said preselected interval so that the water in said bio-chamber is allowed to gradually return to the temperature of said pond; and means for activating (a) said closing means to open said end of said bio-chamber and (b) said pond-water circulating means.

18. Apparatus for removing selected biodegradable materials from a pond or similar body of water, said apparatus comprising:
- a bio-chamber for growing and maintaining a colony of biological microorganisms, said chamber being supported by flotation means so that a portion of the chamber is positioned below the surface of said pond, said bio-chamber being in an enclosure having water impervious walls along its length and at least at one end;
- bio-suspension means positioned within said chamber for providing surfaces for supporting the growth of films of said biological microorganisms;
- circulating means for receiving water from said water body, for delivering said water to said bio-chamber so that said water gently circulates around said bio-suspension means and any films of microorganisms supported thereon, and for returning said circulated water to said water body; and
- air-introduction control means for selectively mixing adjustable amounts of air into the water being circulated in said bio-chamber in a manner that minimizes agitation of said microorganisms.

19. The apparatus of claim 18 wherein said circulating means further comprises intake means for receiving said water at a depth of 4 feet below the surface of said pond.

* * * * *